(12) United States Patent
Wollaston

(10) Patent No.: US 8,579,236 B2
(45) Date of Patent: Nov. 12, 2013

(54) AIRCRAFT SLAT ASSEMBLY WITH ANTI-ICING SYSTEM

(75) Inventor: Timothy Wollaston, Bristol (GB)

(73) Assignee: Airbus Operations Limited, Bristol (GB)

( * ) Notice: Subject to any disclaimer, the term of this patent is extended or adjusted under 35 U.S.C. 154(b) by 116 days.

(21) Appl. No.: 13/352,679

(22) Filed: Jan. 18, 2012

(65) Prior Publication Data
US 2012/0187254 A1 Jul. 26, 2012

(30) Foreign Application Priority Data
Jan. 26, 2011 (GB) .................................... 1101335

(51) Int. Cl.
*B64C 3/50* (2006.01)

(52) U.S. Cl.
USPC .................... 244/214; 244/134 B; 244/134 R

(58) Field of Classification Search
USPC ............................................ 244/214, 134 B
See application file for complete search history.

(56) References Cited

U.S. PATENT DOCUMENTS

| | | | | |
|---|---|---|---|---|
| 3,917,193 A * | 11/1975 | Runnels, Jr. | .................. | 244/207 |
| 4,603,824 A * | 8/1986 | McArdel | .................... | 244/134 B |
| 4,615,499 A * | 10/1986 | Knowler | .................... | 244/134 B |
| 4,674,714 A * | 6/1987 | Cole et al. | ................. | 244/134 B |
| 4,752,049 A * | 6/1988 | Cole | .......................... | 244/134 B |
| 5,865,400 A * | 2/1999 | Pike et al. | ................. | 244/134 B |
| 5,873,544 A * | 2/1999 | Pike et al. | .................... | 244/1 A |
| 6,003,814 A * | 12/1999 | Pike et al. | ................. | 244/134 B |
| 6,595,554 B2 * | 7/2003 | Byrnes | .......................... | 285/179 |
| 6,702,233 B1 * | 3/2004 | DuPont | ..................... | 244/134 B |
| 7,900,872 B2 * | 3/2011 | Sternberger | ............. | 244/134 C |
| 8,015,788 B2 * | 9/2011 | Stephenson et al. | ....... | 60/39.093 |
| 8,033,510 B2 * | 10/2011 | Shmilovich et al. | .......... | 244/208 |
| 8,061,657 B2 * | 11/2011 | Rocklin et al. | ............ | 244/134 B |
| 8,100,364 B2 * | 1/2012 | Nieman et al. | ............ | 244/134 B |
| 8,292,235 B2 * | 10/2012 | Wollaston et al. | ............ | 244/213 |
| 2010/0116944 A1 * | 5/2010 | Wollaston et al. | ............ | 244/214 |
| 2010/0163677 A1 * | 7/2010 | Rocklin et al. | ............ | 244/134 B |
| 2010/0176243 A1 * | 7/2010 | Nieman et al. | ............ | 244/134 B |
| 2012/0168567 A1 * | 7/2012 | Soenarjo | ....................... | 244/213 |

OTHER PUBLICATIONS

Search Report for GB 1101335.6 dated May 25, 2011.

\* cited by examiner

*Primary Examiner* — Christopher P Ellis
*Assistant Examiner* — Medhat Badawi
(74) *Attorney, Agent, or Firm* — Nixon & Vanderhye P.C.

(57) ABSTRACT

An aircraft slat assembly comprising a pair of slats separated by a gap. A weather seal seals the gap between the slats and forms part of an outer aerodynamic surface of the slat assembly. An anti-icing system is provided with a pair of piccolo tubes, each tube being housed within a respective one of the slats and having spray holes for delivering hot gas to a leading edge of the slat in which it is housed. A flexible duct delivers hot gas between the piccolo tubes, the flexible duct passing across the gap between the slats. A vent in the weather seal can open to permit hot gas from the anti-icing system to exit the gap between the slats.

13 Claims, 5 Drawing Sheets

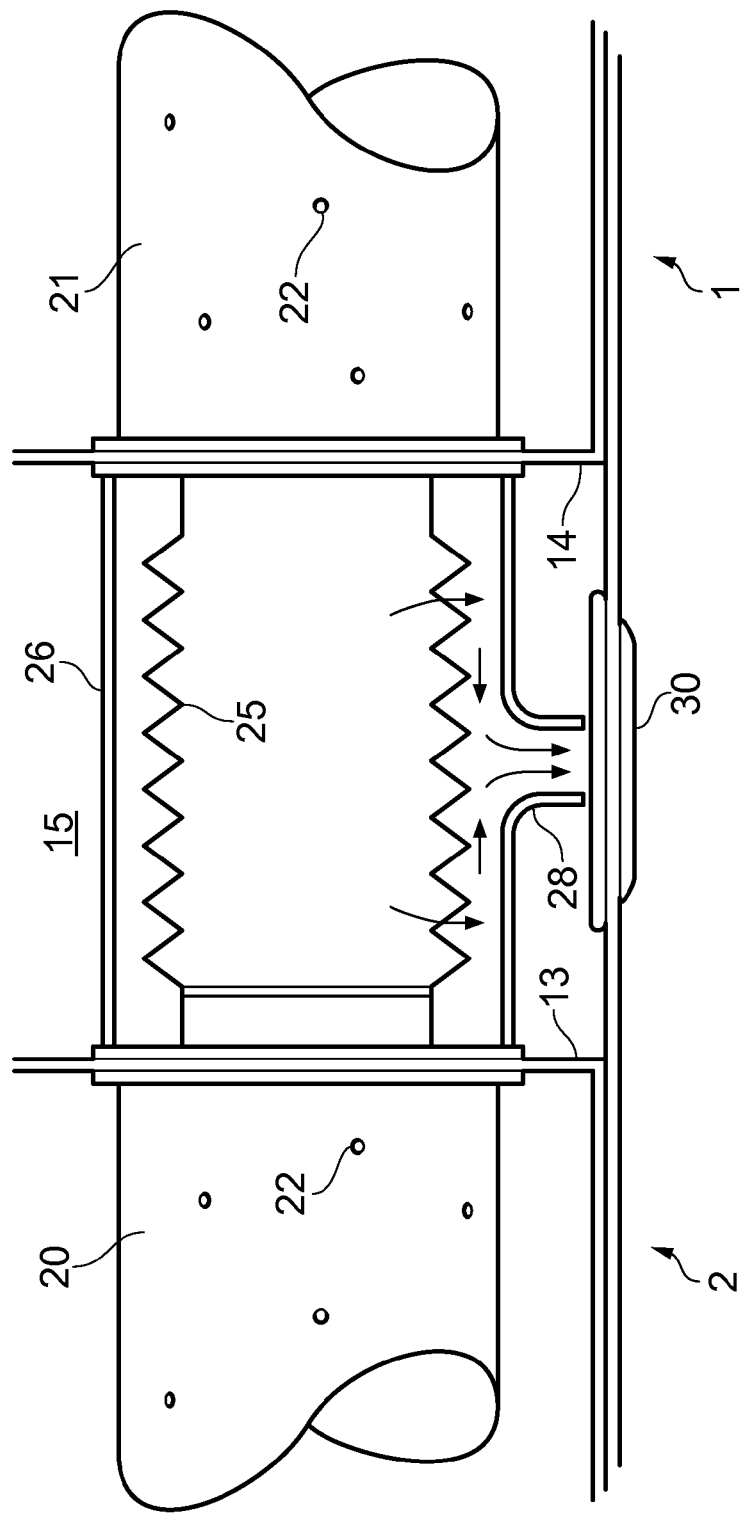

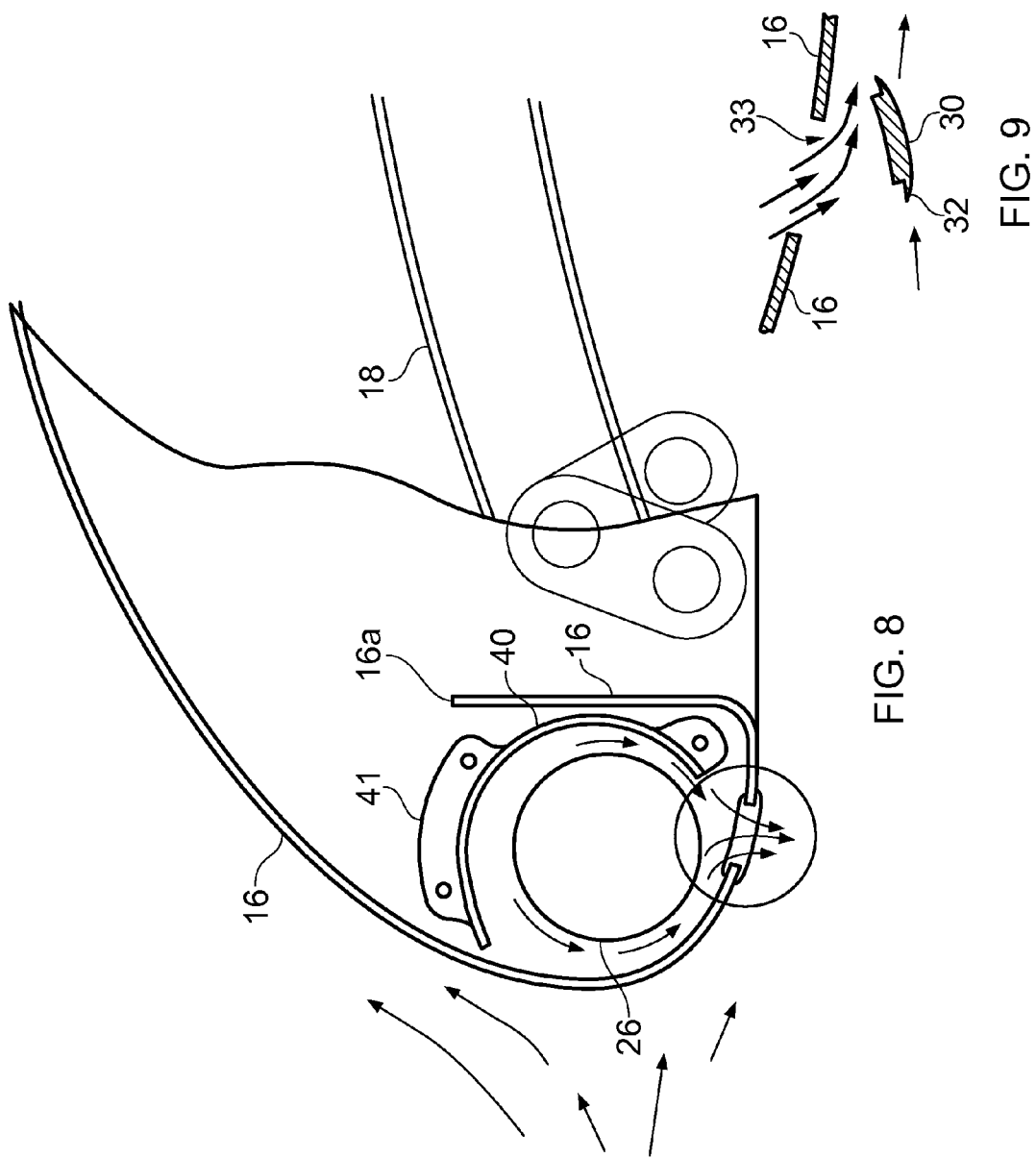

AIRCRAFT SLAT ASSEMBLY WITH ANTI-ICING SYSTEM

This application claims priority to GB 1101335.6 filed 26 Jan. 2011, the entire contents of which is hereby incorporated by reference.

FIELD OF THE INVENTION

The present invention relates to an aircraft slat assembly with an anti-icing system, and a method of venting a gap between a pair of slats on an aircraft wing.

BACKGROUND OF THE INVENTION

U.S. Pat. No. 4,752,049 discloses an aircraft slat assembly comprising five slats with a single anti-icing duct (conventionally known as a piccolo tube) extending through all five slats. Along the length of the piccolo tube there are plural openings to discharge hot bleed air into the anti-icing chamber of each of the slats. The bleed air exits the slat from its trailing edge.

US 2010/0176243 describes a standoff structure for an anti-icing piccolo tube.

SUMMARY OF THE INVENTION

A first aspect of the invention provides an aircraft slat assembly comprising: a pair of slats separated by a gap; a weather seal which seals the gap between the slats and forms part of an outer aerodynamic surface of the slat assembly; an anti-icing system comprising a pair of piccolo tubes, each tube being housed within a respective one of the slats and having spray holes for delivering hot gas to a leading edge of the slat in which it is housed, and a flexible duct for delivering hot gas between the piccolo tubes, the flexible duct passing across the gap between the slats; and a vent in the weather seal which can open to permit hot gas from the anti-icing system to exit the gap between the slats.

A further aspect of the invention provides a method of venting a gap between a pair of slats on an aircraft wing, the method comprising: providing a weather seal which seals the gap between the slats and forms part of an outer aerodynamic surface of the aircraft wing; delivering hot gas to a leading edge of each slat from spray holes of a pair of anti-icing piccolo tubes, each tube being housed within a respective one of the slats; delivering hot gas between the piccolo tubes with a flexible duct which passes across the gap between the slats; flexing the weather seal and the duct to allow movement between the slats; providing a vent in the weather seal; and opening the vent to permit hot gas from the flexible duct to exit the gap between the slats through the vent in the event of failure of the flexible duct.

The vent may comprise a one-way valve, or a thermal fuse which opens the vent by thermal failure when the thermal fuse is heated by the hot gas. For instance the thermal fuse may comprise a thermoplastic material, such as a thermoplastic polymer, which fails when it is heated by the hot gas.

Preferably the assembly further comprising a baffle which extends across the gap between the slats and is positioned to obstruct the flow of hot gas in the gap away from the vent.

Preferably the weather seal and/or the flexible duct are formed from an elastomeric material.

A further aspect of the invention provides an aircraft wing comprising a main wing body with a leading edge; a slat assembly according to the first aspect mounted on the leading edge of the main wing body; and an actuation mechanism for moving the slat assembly relative to the main wing body between an extended position and a retracted position.

Typically the leading edge of the main wing body is formed from a composite material, such as a fibre-reinforced polymer. Such material is sensitive to damage by hot gasses, and can be protected by the venting of the hot gas.

The anti-icing system may be operated to prevent the build-up of ice on the leading edges of the slats and/or to remove ice which has built up on them.

BRIEF DESCRIPTION OF THE DRAWINGS

Embodiments of the invention will now be described with reference to the accompanying drawings, in which:

FIG. 7 is a sectional view through part of two adjacent slats;

FIG. 8 is a sectional view through the slat assembly showing part of the actuation mechanism; and FIG. 9 is a sectional view of the vent plug.

DETAILED DESCRIPTION OF EMBODIMENT(S)

Figure 1:
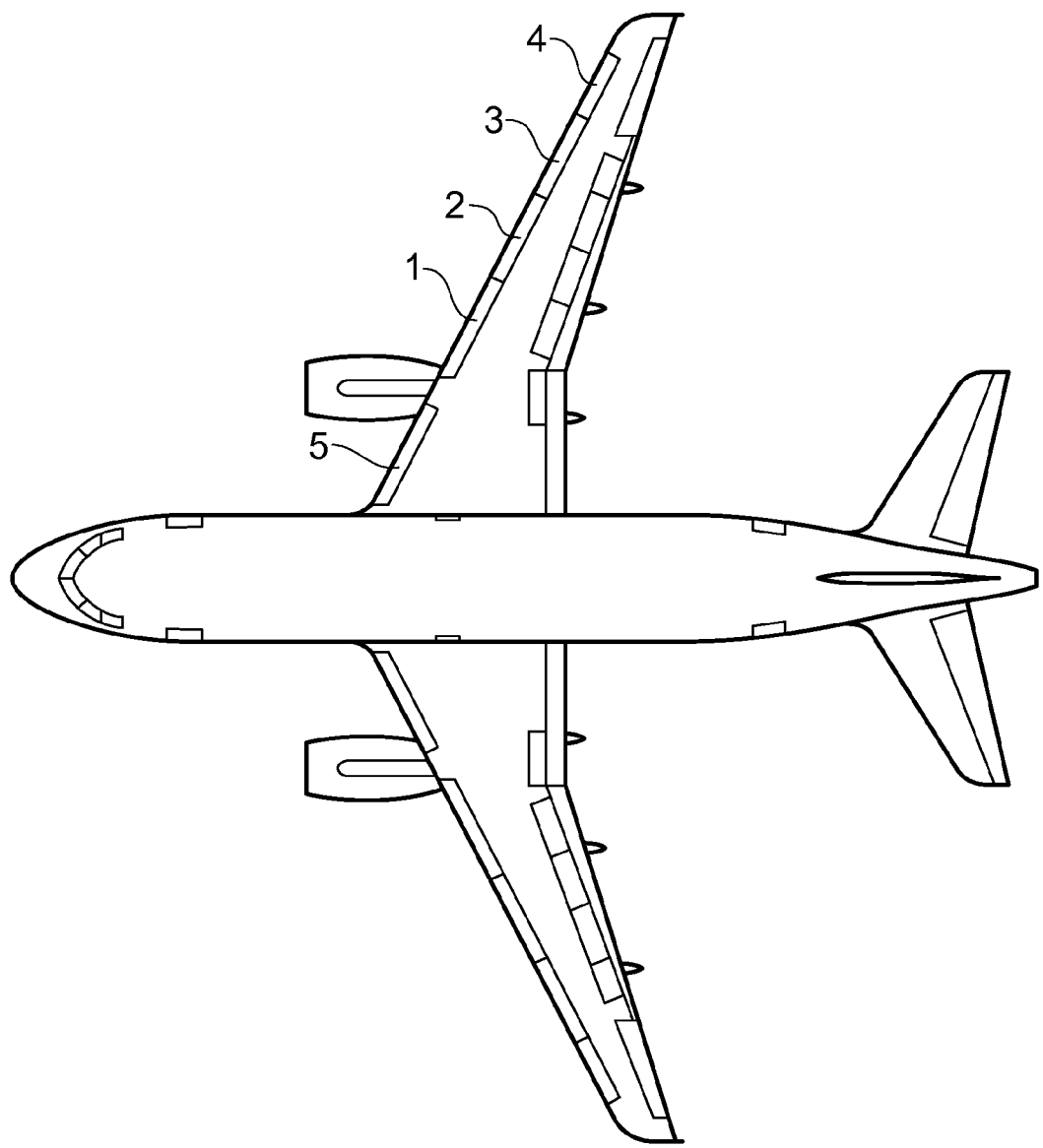
FIG. 1 is a plan view of an aircraft incorporating a slat assembly according to an embodiment of the invention.

FIG. 1 is a plan view of an aircraft with a pair of wings. Each wing has four outboard slats 1-4 and a single inboard slat 5. The outboard slats 1-4 together constitute a slat assembly, with the slats 1-4 being connected together by weather seals (described in detail below) and moved together by a slat actuation mechanism (also described in detail below).

Figure 2:
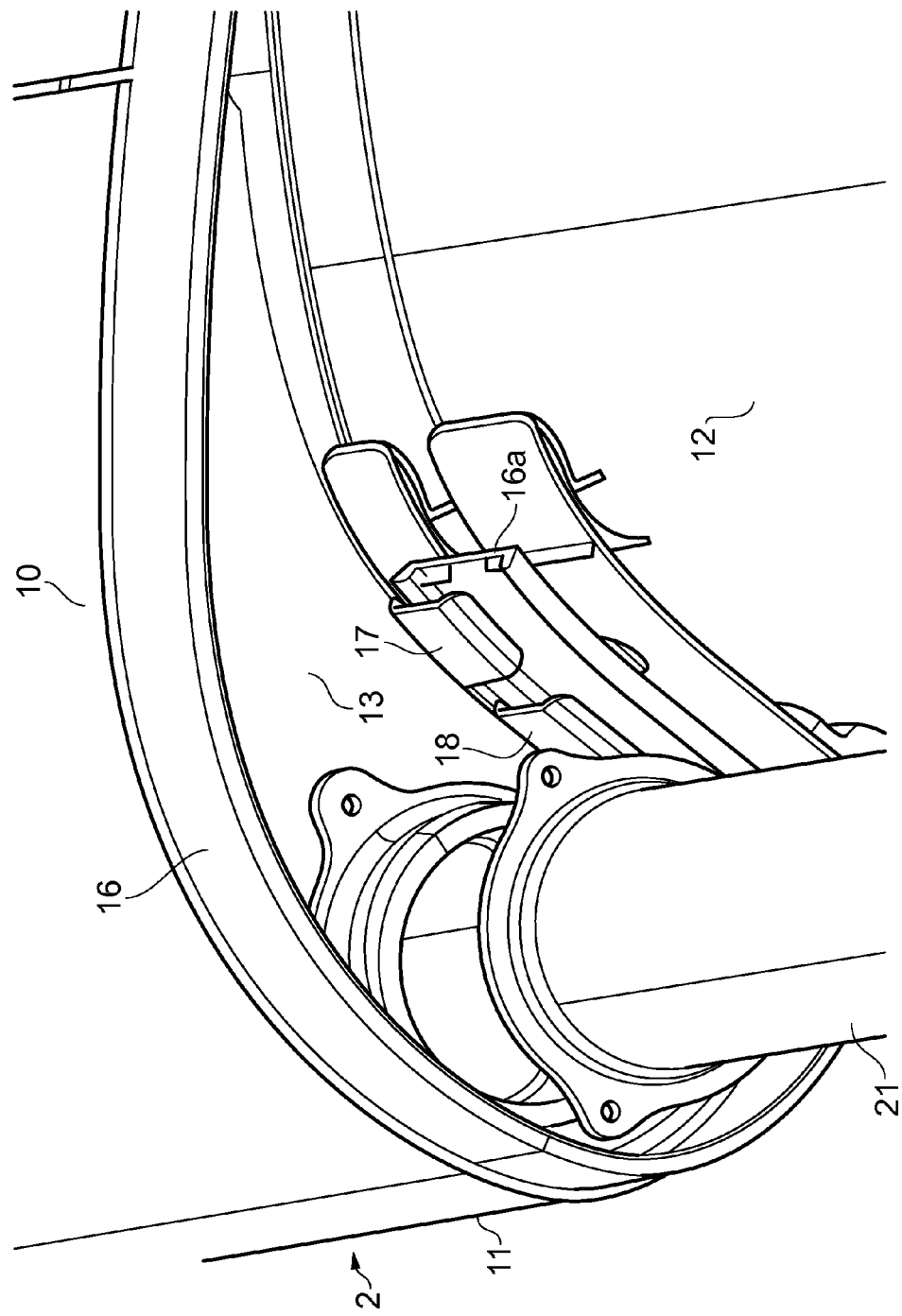
FIG. 2 is a perspective view of one of the slats with the adjacent slat removed.

FIG. 2 is a view showing the slat 2, with the slat 1 being removed to make various internal parts visible. The slats 1,3,4 have a similar construction to the slat 2. Each slat has an outer skin which forms an aerodynamic surface of the slat and has an upper surface 10, a leading edge 11 and a lower surface which engages a D-nose leading edge 12 of the main wing body when the slat is in its retracted position as shown in FIG. 2. A slat actuation mechanism drives the slats 1-4 between the retracted position shown in FIG. 2 and an extended position (not shown) in which the slats have moved forwards, down and away from the D-nose leading edge, increasing the camber of the wing and hence increasing lift. The slat actuation mechanism is not shown in detail, but a part of the mechanism is indicated schematically in FIG. 8—namely a slat track 18 which carries the slat and is driven backwards and forwards on rollers (not shown).

Figure 6:
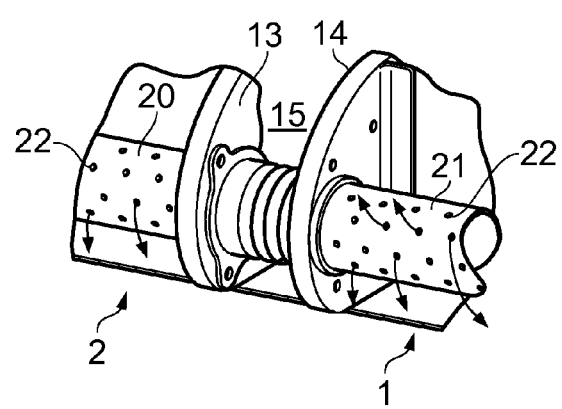
FIG. 6 is a perspective view from the front of the slat assembly with the leading edge and upper parts of the slat skins removed to show the anti-icing system.

Each slat has an inboard face and an outboard face, the inboard face 13 of the slat 2 being visible in FIG. 2 and the outboard face 14 of the slat 1 being visible in FIGS. 6 and 7. The inboard and outboard faces of each adjacent pair of slats are separated by a gap 15, shown in FIGS. 6 and 7. A resilient rubber weather seal 16 seals the gap between the slats and forms part of the outer aerodynamic surface of the slat assembly as shown most clearly in FIG. 8, preventing the air stream from entering the gap. The weather seal 16 comprises a rubber strip which runs from the trailing edges of the slats, round the leading edge, and terminates at an edge 16a on the underside of the slats approximately half way between their leading and trailing edges. The seal 16 has a U-shaped profile with a pair of flanges which are secured to the slats by clips 17,18 shown in FIG. 2.

Each of the slats 1-4 houses a respective anti-icing piccolo tube 20,21. Each tube has spray holes 22 (shown in FIGS. 6 ad 7) for delivering engine bleed air to the leading edge 11 of the slat in which it is housed. The bleed air exits each slat via a vent (not shown) in its trailing edge. Each adjacent pair of piccolo tubes is connected together by a flexible boot or duct which passes across the gap between the slats and is joined to each piccolo tube by a respective duct joint. One of the ducts is shown in section in FIG. 7. It comprises a rubber bellows 25 with a concertina shape which provides the primary route for the flow of air between the piccolo tubes, and a rubber outer sleeve 26 with a cylindrical shape which provides secondary protection in the event of failure of the bellows 25. Each sleeve 25,26 is connected at each end to one of the piccolo tubes by a respective joint. Bleed air from the engine is fed to the piccolo tube 21 in the innermost outboard slat 1, and passes through the four serially connected piccolo tubes via their connecting bellows 25.

As the wing bends, the slats 1-4 move slightly relative to each other, and the rubber weather seals 16 and ducts 25,26 flex slightly to accommodate such movement. Also, the weather seals 16 and ducts 25,26 can flex to allow vibrating movement between the slats.

During normal operation, the flexible bellows 25 convey bleed air between the piccolo tubes without permitting it to leak into the gap 15 between the slats. However, in the event of a failure in both flexible ducts 25,26 (or their joints with one of the piccolo tubes) then bleed air will enter the gap 15. Such a failure is shown in FIG. 7 in which both the inner sleeve 25 and the outer sleeve 26 (indicated in FIG. 7 by a break 28) have failed. If this leaking bleed air is permitted to contact the D-nose leading edge 12 of the wing, then it may cause damage to the carbon-fibre reinforced epoxy resin composite material which forms the D-nose leading edge 12.

Figure 4:
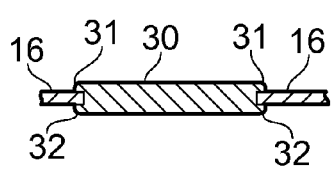
FIG. 4 is a sectional view through the vent plug.

To reduce the risk of such damage the weather seal 16 contains a vent which is normally closed, but can open to permit the bleed air to exit the gap 15 in the event of such a failure. The vent is normally closed by a plug comprising a circular disk 30 and a pair of annular flanges 31,32 which grip the weather seal 16 as shown in FIG. 4. The disk 30 and flanges 31,32 are moulded together as a single piece of a thermoplastic material such as thermoplastic polyimide. The bleed air is at a high temperature—typically 200° C. or higher—so when it comes into contact with the flange 31 it causes is to melt or thermally fail structurally so the vent plug permanently falls away from the aircraft, allowing the bleed air to exit the gap through a hole 33 in the weather seal as shown in FIG. 9.

Figure 3:
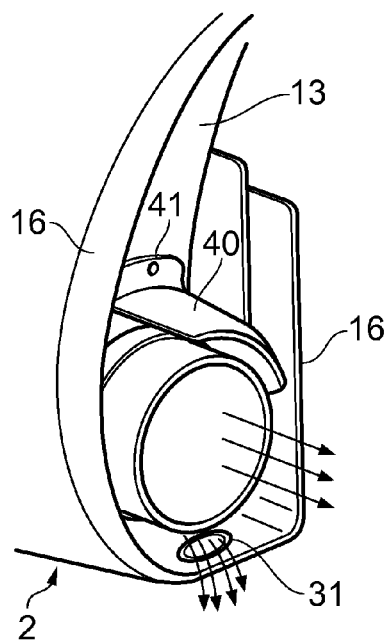
FIG. 3 is a perspective view of one of the slats including the baffle.
Figure 5:
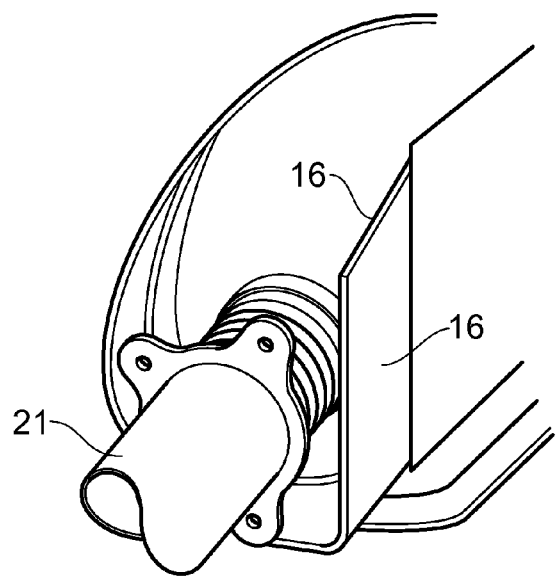
FIG. 5 is a perspective view of one of the slats showing a weather seal and piccolo tube.

A baffle 40 extends across the gap 15 and is positioned just behind the sleeve 26 to obstruct the flow of bleed air in the gap away from the vent. The baffle 40 is attached to the inboard and outboard faces of the slats by flanges, one of the flanges 41 being shown in FIGS. 3 and 8.

The plug may be formed from a brightly coloured and/or fluorescent material, so its absence can be checked easily by visual inspection before a flight, thus highlighting the fault to the aircrew.

Although the invention has been described above with reference to one or more preferred embodiments, it will be appreciated that various changes or modifications may be made without departing from the scope of the invention as defined in the appended claims.

The invention claimed is:
1. An aircraft slat assembly comprising:
 a. a pair of slats separated by a gap;
 b. a weather seal which seals the gap between the slats and forms part of an outer aerodynamic surface of the slat assembly;
 c. an anti-icing system comprising:
  i. a pair of piccolo tubes, each tube being housed within a respective one of the slats and having spray holes for delivering hot gas to a leading edge of the slat in which it is housed; and
  ii. a flexible duct for delivering hot gas between the piccolo tubes, the flexible duct passing across the gap between the slats; and
 d. a vent in the weather seal which can open to permit hot gas from the anti-icing system to exit the gap between the slats.
2. The assembly of claim 1 wherein the vent comprises a thermal fuse which opens the vent by thermal failure when the thermal fuse is heated by the hot gas.
3. The assembly of claim 2 wherein the thermal fuse comprises a thermoplastic material which fails when it is heated by the hot gas.
4. The assembly of claim 1 wherein the vent comprises a plug which normally closes the vent and can be removed to open the vent and permit hot gas from the anti-icing system to exit the gap between the slats.
5. The assembly of claim 1 further comprising a baffle which extends across the gap between the slats and is positioned to obstruct the flow of hot gas in the gap away from the vent.
6. The assembly of claim 1 wherein the weather seal and/or the flexible duct are formed from an elastomeric material.
7. An aircraft wing comprising a main wing body with a leading edge; a slat assembly according to claim 1 mounted on the leading edge of the main wing body; and an actuation mechanism for moving the slat assembly relative to the main wing body between an extended position and a retracted position.
8. The wing of claim 7 wherein the leading edge of the main wing body is formed from a composite material.
9. A method of venting a gap between a pair of slats on an aircraft wing, the method comprising:
 a. providing a weather seal which seals the gap between the slats and forms part of an outer aerodynamic surface of the aircraft wing;
 b. delivering hot gas to a leading edge of each slat from spray holes of a pair of anti-icing piccolo tubes, each tube being housed within a respective one of the slats;
 c. delivering hot gas between the piccolo tubes with a flexible duct which passes across the gap between the slats;
 d. flexing the weather seal and the duct to allow movement between the slats;
 e. providing a vent in the weather seal; and
 f. opening the vent to permit hot gas from the flexible duct to exit the gap between the slats through the vent in the event of failure of the flexible duct.
10. The method of claim 9 wherein the vent comprises a thermal fuse which opens the vent by thermal failure when the thermal fuse is heated by the hot gas.
11. The method of claim 10 wherein the thermal fuse comprises a thermoplastic material which fails when it is heated by the hot gas.
12. The method of claim 9 wherein the vent comprises a plug which is removed to open the vent.

13. The method of claim 9 further comprising obstructing the flow of hot gas in the gap away from the vent with a baffle which extends across the gap between the slats.

\* \* \* \* \*